United States Patent [19]

Barker

[11] Patent Number: 5,785,382
[45] Date of Patent: Jul. 28, 1998

[54] INFANT CAR SEATS

[75] Inventor: Derrick John Martin Barker, West Midlands, England

[73] Assignee: Bettacare Limited, Surrey, England

[21] Appl. No.: 693,265
[22] PCT Filed: Jan. 19, 1995
[86] PCT No.: PCT/GB95/00100
  § 371 Date: Aug. 16, 1996
  § 102(e) Date: Aug. 16, 1996
[87] PCT Pub. No.: WO95/22471
  PCT Pub. Date: Aug. 24, 1996

[30] Foreign Application Priority Data

Feb. 16, 1994 [GB] United Kingdom ........... 9402923

[51] Int. Cl.$^6$ ............................................... A47C 1/08
[52] U.S. Cl. ................... 297/250.1; 297/219.12; 297/284.2; 297/230.14
[58] Field of Search ............... 297/250.1, 219.12, 297/226, 229, 230.11, 230.14, 256.1, 283.1, 283.2, 284.1, 284.2

[56] References Cited

U.S. PATENT DOCUMENTS 4,478,543 10/1984 Schutz ................. 297/219.12
4,998,307 3/1991 Cone.

FOREIGN PATENT DOCUMENTS

| 14264 | 5/1914 | United Kingdom | 297/284.2 |
| 1360241 | 7/1974 | United Kingdom | 297/284.2 |
| 2137084 | 10/1984 | United Kingdom | 297/250.1 |
| 2165443 | 4/1986 | United Kingdom | 297/250.1 |

*Primary Examiner*—Laurie K. Cranmer
*Attorney, Agent, or Firm*—McAulay Fischer Nissen Goldberg & Kiel, LLP

[57] ABSTRACT

An infant car seat comprises a back support portion and a leg support portion which merge together at a junction region and which afford respective retaining means. Overlying the junction region is a flexible contour modifying sheet with engagement means at each of two opposed ends. The engagement means at one end are inseparably engaged with the associated retaining means whereby the contour modifying member is not removable from the seat. The other engagement means then extends between the two retaining means spaced from the junction region and has a radius of curvature greater than that of the junction region.

18 Claims, 3 Drawing Sheets

INFANT CAR SEATS

BACKGROUND OF THE INVENTION

1. Field of the Invention

The present invention relates to infant car seats, that is to say seats in which infants are accommodated, and generally restrained by a restraining belt, and which are secured on a conventional car seat, usually by means of the seat belt which is provided for use by an adult.

2. Description of the Prior Art

Infant car seats comprise a leg support portion and a back support portion, which usually form an integral unit, which are connected or merge together at the base of the back support portion. At the transition region between the two portions the seat usually has a relatively sharp curvature, that is to say a small radius of curvature. This is acceptable and indeed desirable for larger infants so as to induce a satisfactory seating posture but can produce problems for smaller infants. Infant car seats for newborn babies are typically designed for infants with a weight of 3.2 kg and above but an increasing number of babies are being born with a body weight of significantly less than this, e.g. 2 kg or even less. When such small babies are placed on a typical car seat, they slump into the curvature of the seat and adopt a posture which can be very uncomfortable and, more importantly, can lead to blockage of the infant's airway and thus potentially to death.

U.S. Pat. No. 4,998,307 discloses an infant vehicle restraint device which is convertible between a cot and a seat. The restraint device includes lower and upper shell portions which are pivotally connected together to be movable between a planar configuration, in which they define a car seat, and an angled configuration, in which they define a cot. The upper shell portion has a support surface and the lower shell portion has a further support surface for supporting the legs of the infant which has a central hinge and is connected by means of straps to the upper support surface. When the device is in the cot configuration, the lower support surface is bent at the hinge and adopts an angled configuration. When the restraint device is in the car seat configuration, the lower support surface adopts an upwardly inclined planar configuration.

Whilst the radius of curvature between the two portions of the known restraint device may be increased, this is only in the context of converting the restraint device from a seat to a cot. However, many parents do not wish their infant to travel in a car in a prone position and when in the cot configuration the known restraint device is too large to be received on a conventional car seat and secured by the seat belt associated therewith. Furthermore, the known restraint device is complex and bulky and thus heavy and expensive.

It is therefore the object of the present invention to provide an infant car seat with a contour modifier which is cheap, simple and light and which may be used to modify the contour of a conventionally shaped seat so that it is appropriate for a baby of low weight and which may also be readily rendered inoperative so that the seat is still usable by a child once its weight has reached the value for which the seat was originally designed.

SUMMARY OF THE INVENTION

According to the present invention an infant car seat comprising a back support portion and a leg support portion which merge together at a junction region is characterised in that each of the said portions has retaining means and that a flexible contour modifying member, e.g. a sheet of textile or plastics material, is provided having respective engagement means adjacent each of two opposed sides, the engagement means being engageable with respective retaining means, whereby the contour modifying member then extends between the two retaining means spaced from the junction region of the back support region and the leg support region and has a radius of curvature greater than that of the junction region.

Thus the seat in accordance with the present invention includes a flexible contour modifying sheet which may be secured to the seat across the junction region thereby increasing the radius of curvature of the junction region and rendering the seat suitable for an infant of low body weight of 2 kg or even less.

The contour modifying member may be wholly removable from the seat and only connected to it when it is required but it is preferred for safety reasons that it is irremovable from the seat and for this purpose one of the engagement means may be inseparably engaged with the respective retaining means whereby the contour modifying member is not readily removable from the seat, that is to say may not be removed without destroying or damaging either the seat or contour modifying member.

The retaining and engagement means may be situated on the upper or support surface of the seat but this is liable to lead to discomfort of the infant and it is therefore preferred that they are situated at the rear of the seat. For this purpose, it is convenient if portions of the contour modifying member extend through apertures in the seat and in one preferred embodiment the back support portion and the leg support portion have one or more respective slots formed in it through which respective portions of the contour modifying member extend, the retaining means and the engagement means being thereby situated at the rear surface of the seat.

The retaining means and engagement means may take various forms, e.g. cooperating portions of a zip fastener, cooperating studs and recesses or the like but in one simple form of the invention the said one of the engagement means is connected to the associated portions of the contour modifying member and is unable to pass through the associated slot whereby the retaining means is effectively constituted by the portions of the seat defining the slot.

Similarly, it is preferred that the other engagement means is connected to the associated portions of the contour modifying member and is unable to pass through the associated slot.

In one simple embodiment the said portions of the contour modifying member have a tube formed in them, e.g. by stitching or otherwise securing the ends of the said portions to an intermediate region thereof, in which a respective bar is received which then constitutes the engagement means.

The retaining means associated with the other engagement means may simply comprise a surface which is inclined to the associated slot and which is positioned to be engaged by the other engagement means and thus to retain it in position.

In the simplest form of the invention the contour modifying means is thus movable between two positions, in one of which it is essentially flush with or engages the junction region of the seat and thus does not modify its contour and in the other of which it is spaced from the junction region and modifies the contour of the seat. It will, however, be appreciated that it would be a simple matter to arrange the seat so that the contour modifying member is adjustable between three positions, in two of which it modifies the contour of the seat to different extents so as to enable the contour of the seat to be matched more precisely to the most desirable contour for the specific weight of the infant which is to use the seat. Indeed, the contour modifying member could also be steplessly adjustable.

The present invention therefore provides a seat with a flexible contour modifying sheet and what might be thought of as tightening means for tightening the contour modifying sheet and thereby modifying the contour of the seat. Thus according to a further aspect of the present invention an infant car seat of the type comprising a back support portion and a leg support portion which merge together at a junction region is characterised in that a flexible contour modifying sheet is provided which is connected at one side in a non-readily removable manner to one of the back support and leg support portions and is connected at the other side to the other of the back support and leg support portions by tightening means which may be moved or operated to tighten the contour modifying sheet from a position in which it engages the junction region of the back support and leg support portions to a position in which it is spaced from the junction region and constitutes a support surface whose radius of curvature is greater than that of the junction region. The tightening means may take a variety of forms such as retaining or fastening means on the contour modifying member which may be selectively engaged with and disengaged from engagement means on the seat and this engagement may be of positive type, e.g. by virtue of interlocking fastener members, or of non-positive type. Alternatively, the tightening means could be of e.g. overcentre lever type or include a lockable roller onto which a portion of the contour modifying member may be rolled when it is desired to modify the contour of the seat.

BRIEF DESCRIPTION OF THE DRAWINGS

Further features and details of the invention will be apparent from the following description of one specific embodiment which is given by way of example with reference to the accompanying drawings, in which.

DESCRIPTION OF THE PREFERRED EMBODIMENT

Figure 1:
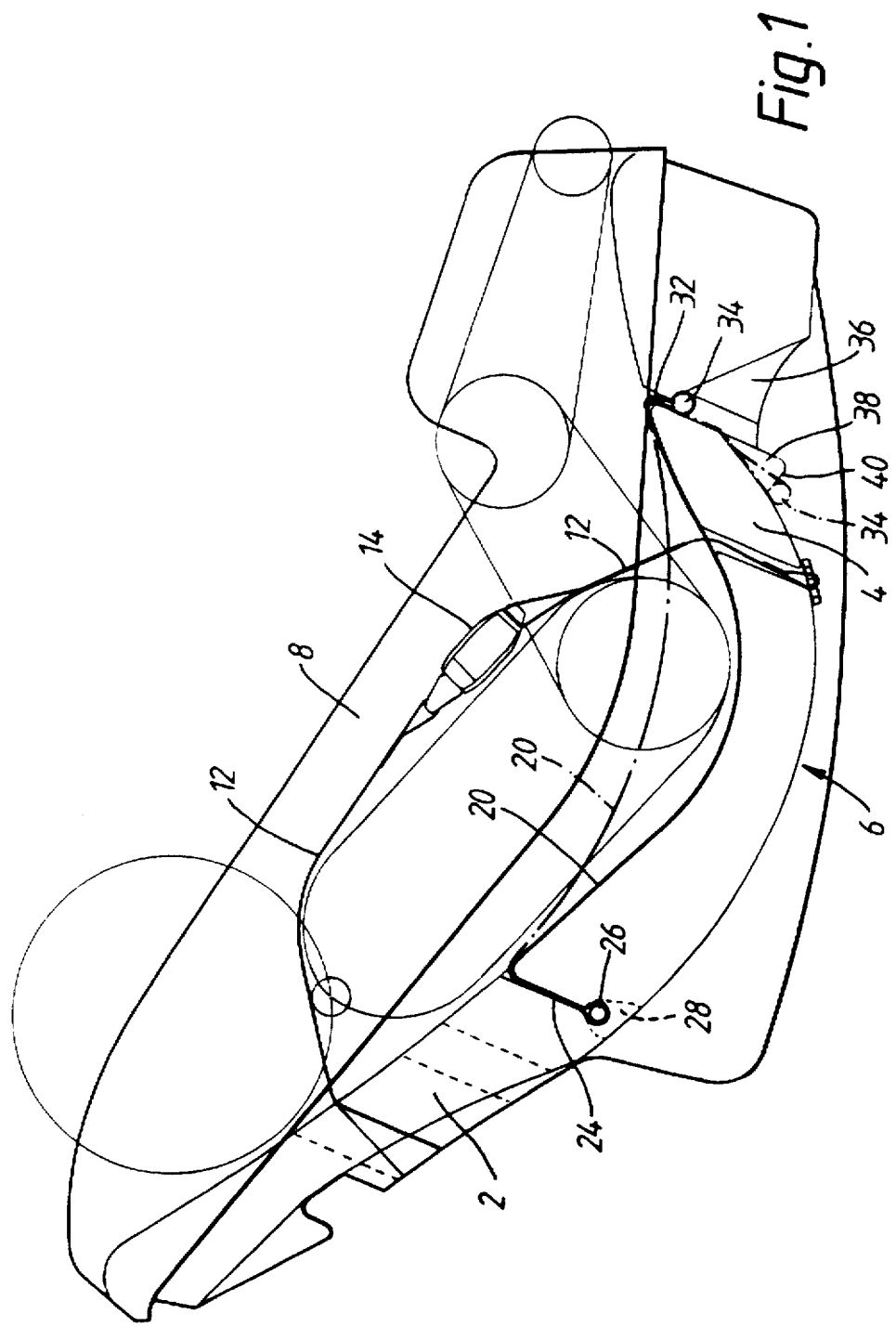
FIG. 1 is a side view of a car seat in accordance with the invention with a highly schematic representation of an infant seated on it.
Figure 2:
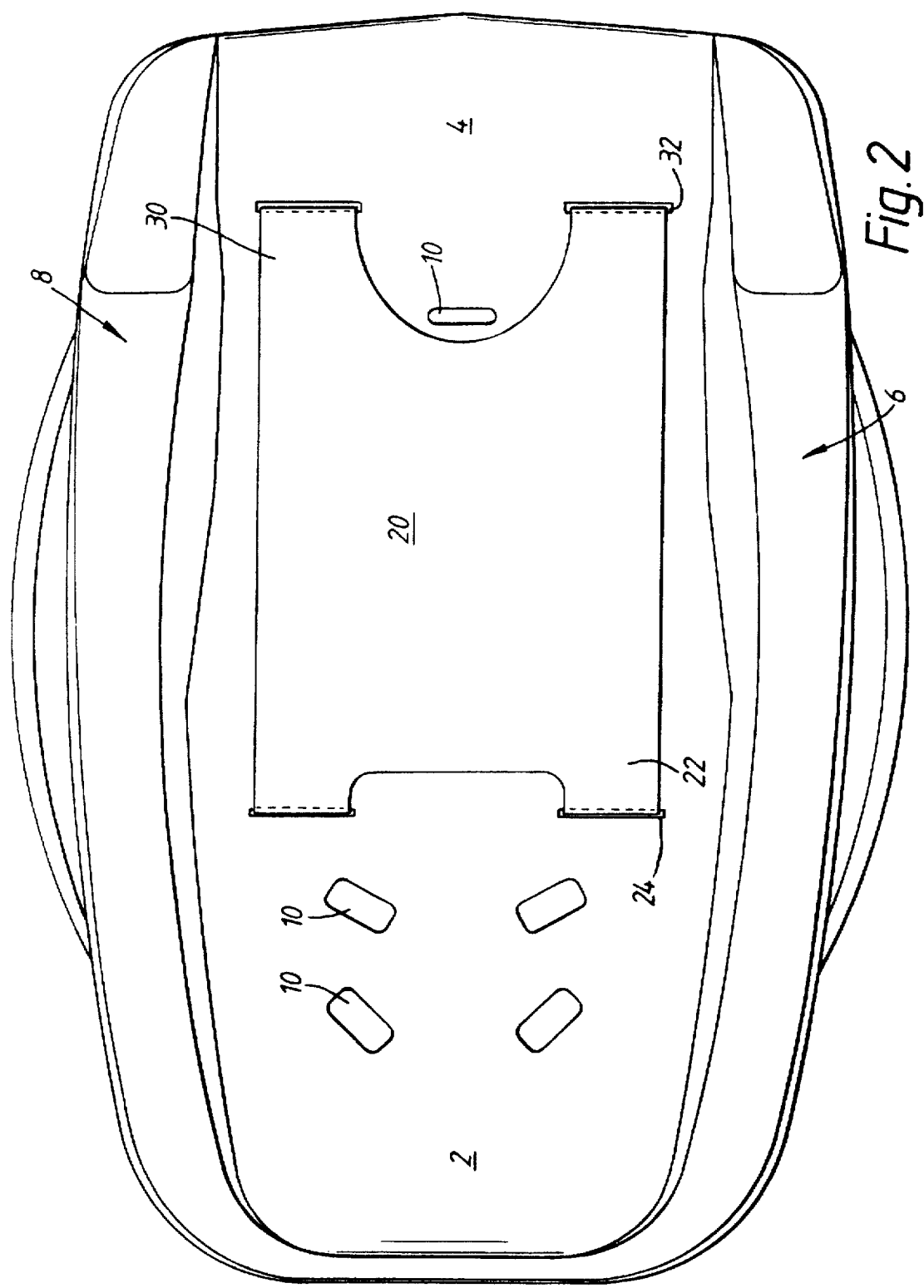
FIG. 2 is a plan view of the seat.
Figure 3:
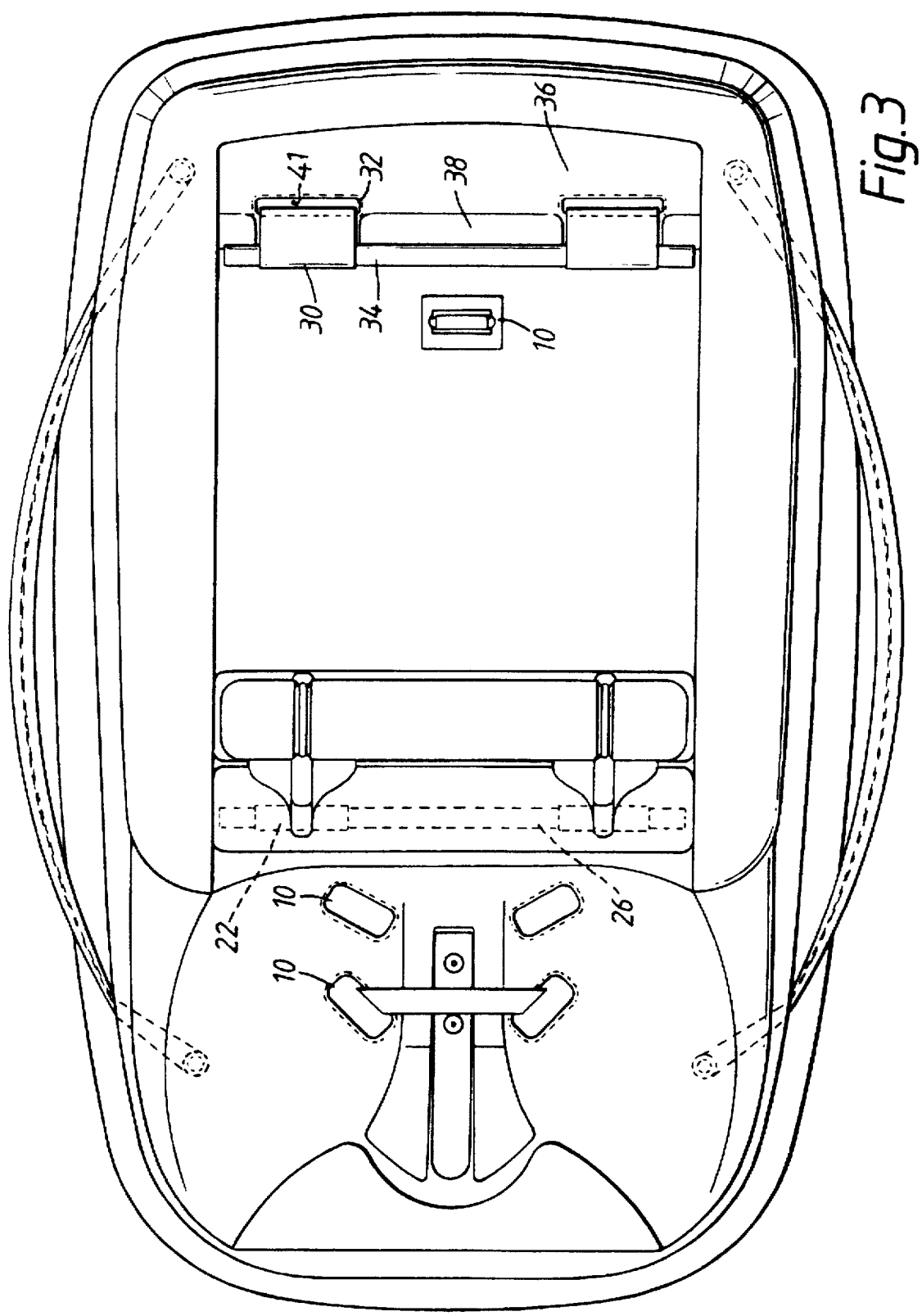
FIG. 3 an underneath view of the seat.

The body of the seat comprises a one-piece moulding of expanded plastics material, such as polyurethane. Such material is not only light and strong but has very substantial impact resistance and thus serves to cushion and protect the infant in the event of a collision. The seat thus has a back support portion 2 which is integral with a leg support portion 4 and merges with it over a junction region which is generally designated 6. The region 6 is relatively sharply curved, that is to say has a relatively small radius of curvature, as is usual with seats. This is not a problem with relatively large infants but, as explained above, can constitute a problem and even be life threatening for infants with a weight less than about 4 kg and particularly 3.5 or 3 kg. Both the back and leg support portions have relatively high upstanding side edges 8 which provide lateral support and protection for the infant. Connected to the side edges 8 are carrying straps to enable the seat to be carried with an infant within it. The seat is provided with a number of apertures 10 for receiving and locating portions 12 of a safety belt or protective harness which are connected together, in use, by a buckle or snap fitting 14. These are generally conventional and form no part of the present invention and will therefore not be described in detail. In use, the seat will be covered by upholstery and/or padding but this has been omitted from the drawings for the sake of clarity. The underside of the seat is located within and secured, e.g. by adhesive to a reinforcing rigid shell of e.g. polycarbonate material but this also been omitted from the drawings for the sake of clarity.

As described so far, the car seat is generally conventional. However, the seat also includes a contour modifier which enables the radius of curvature of the region 6 to be selectively increased when the seat is to be used by a very small infant. The contour modifier comprises a generally rectangular sheet 20 of flexible material, e.g. woven material or a sheet of substantially inextensible plastics material which is secured at its two ends to the back support portion 2 and the leg support portion 4, respectively. For safety reasons it is preferred that the connection at at least one end is permanent, that is to say not readily releasable and in this case the connections are permanent, though one of them is adjustable. For this purpose the contour modifying sheet has two lateral longitudinally extending flaps or tongues 22 at its top end. These extend through respective transversely extending slots 24 in the back support portion. At the rear of the seat the tongues 22 are permanently secured to a locking bar 26, e.g. by forming loops in the ends of the tongues by means of stitching or the like and passing the bar through the loops. When tension is applied to the sheet 20 the bar 26 is drawn into an elongate recess 28 at the rear of the seat and then into contact with the material between the slots 24 thereby preventing the tongues 22 from being retracted through the slots. At the other or foot end of the sheet 20 it is provided with two similar lateral, longitudinally extending tongues 30 which pass through similar transverse slots 32 formed in the leg support portion 4. The ends of the tongues 30 are again stitched or otherwise secured to form loops through which a common bar 34 extends. Formed in the underside of the leg support portion is a downwardly flared recess 36 which extends across substantially its entire width. Extending along the edge of the recess 36 on the head support portion side is an elongate projection or ledge 38 which affords an engagement surface 40 which extends substantially at right angles to the slots 32.

The bar 34 is thus movable between a first or slack position in which it is in engagement with the material of the roof of the recess 36 between the slots 32 and a second or tightened position in which it is in engagement with the engagement surface 40 and the tongues 30 pass through gaps 41 in the ledge 38. When the bar 34 is in the first position the contour modifying sheet occupies the position shown in solid lines in FIG. 1 in which it is in engagement with the internal surface of the seat. In this configuration the seat is suitable for a larger infant whose weight is in excess of, say, 4 kg but is not very suitable, for the reasons explained above, for a small infant whose weight is, say, only 2.5 kg. When the bar 34 is in the second position, the contour modifying sheet 20 occupies the position shown in chain lines in FIG. 1 in which it is spaced from the upper surface of the seat and itself constitutes a support surface. The sheet 20 thus modifies the effective contour of the seat, that is to say increases the radius of curvature of the transition region between the leg and back support portions of the seat, and renders the seat suitable for use by infants of low body weight.

I claim:

1. An infant car seat comprising:

a back support portion and a leg support portion;

said back support and leg support portions having respective retaining means and merging together at a junction region;

a flexible contour modifying member having two opposed sides and further having respective engagement means adjacent each of said opposed sides;

said engagement means being engageable with respective ones of said retaining means to position said contour modifying member in an extended position in which it adopts a curved configuration extending between said two retaining means and is spaced from the junction region of said back support and leg support regions;

said contour modifying member, when in said extended position, having a radius of curvature greater than that of said junction region;

said seat having a rear surface;

said back support and leg support portions each have at least one respective slot formed therein through which respective portions of said contour modifying member extend; and said retaining means and said engagement means being situated at the rear surface of said seat.

2. A seat as claimed in claim 1, wherein one of said engagement means is inseparably engaged with the respective one of said retaining means, whereby said contour modifying member is not readily removable from said seat.

3. A seat as claimed in claim 2, wherein said seat has a rear surface; and wherein said back support and leg support portions each have at least one respective slot formed therein through which respective portions of said contour modifying member extend; and said retaining means and said engagement means are situated at the rear surface of said seat.

4. A seat as claimed in claim 3, wherein one of said engagement means is inseparably engaged with the respective one of said retaining means, whereby said contour modifying member is not readily removable from said seat, and wherein said one of said engagement means is connected to the associated portion of said contour modifying member and is unable to pass through the associated one of said slots.

5. A seat as claimed in claim 4, wherein the other of said engagement means is connected to associated portions of said contour modifying member and is unable to pass through the associated one of said slots.

6. A seat as claimed in claim 4, wherein said portions of said contour modifying member have a tube formed in them; said engagement means comprising a respective bar received in said tube.

7. A seat as claimed in claim 3, wherein said portions of said contour modifying member have a tube formed in them; said engagement means comprising a respective bar received in said tube.

8. A seat as claimed in claim 3, wherein the other of said engagement means is connected to associated portions of said contour modifying member and is unable to pass through the associated one of said slots.

9. A seat as claimed in claim 8, wherein said portions of said contour modifying member have a tube formed in them; said engagement means comprising a respective bar received in said tube.

10. A seat as claimed in claim 8, wherein the retaining means associated with the other of said engagement means comprises a surface which is inclined to the associated one of said slots and which is positioned to be engaged by the other of said engagement means and to retain it in position.

11. A seat as claimed in claim 10, wherein said seat has a rear surface; and wherein said back support and leg support portions each have at least one respective slot formed therein through which respective portions of said contour modifying member extend; said retaining means and said engagement means being situated at the rear surface of said seat; and wherein each said slot communicates with an elongate recess on the rear of said seat.

12. A seat as claimed in claim 3, wherein said contour modifying member has two sides; each of said sides having two transversely spaced portions which extend through respective ones of said slots in said back support and leg support portions, respectively.

13. A seat as claimed in claim 2, wherein said one of said engagement means is connected to the associated portion of said contour modifying member and is unable to pass through the associated one of said slots.

14. A seat as claimed in claim 13, wherein the other of said engagement means is connected to associated portions of said contour modifying member and is unable to pass through the associated one of said slots.

15. A seat as claimed in claim 14, wherein said portions of said contour modifying member have a tube formed in them; said engagement means comprising a respective bar received in said tube.

16. A seat as claimed in claim 2, wherein said portions of said contour modifying member have a tube formed in them; said engagement means comprising a respective bar received in said tube.

17. A seat as claimed in claim 1, wherein said contour modifying member has two sides; each of said sides having two transversely spaced portions which extend through respective ones of said slots in said back support and leg support portions, respectively.

18. A seat as claimed in claim 1, wherein said contour modifying member has two sides; each of said sides having two transversely spaced portions which extend through respective ones of said slots in said back support and leg support portions, respectively.

* * * * *